United States Patent [19]
Matsufuji

[11] Patent Number: 5,937,697
[45] Date of Patent: Aug. 17, 1999

[54] POWER TAKE-OFF ASSEMBLY FOR TRACTORS

[75] Inventor: Mizuya Matsufuji, Sanda, Japan

[73] Assignee: Kanzaki Kokyukoki Mfg. Co., Ltd., Amagasaki, Japan

[21] Appl. No.: 09/009,209

[22] Filed: Jan. 20, 1998

[30] Foreign Application Priority Data

Feb. 7, 1997 [JP] Japan .................................. 9-040015

[51] Int. Cl.⁶ .................................................. B60K 17/04
[52] U.S. Cl. .......................... 74/11; 74/15.4; 180/53.1; 180/53.4
[58] Field of Search .......................... 74/11, 15.66, 15.4, 74/606 R; 180/53.1, 53.4, 53.7

[56] References Cited

U.S. PATENT DOCUMENTS

| | | | |
|---|---|---|---|
| 2,913,064 | 11/1959 | Ferguson et al. | 74/11 |
| 3,405,766 | 10/1968 | Todeschini | 172/10 |
| 4,856,355 | 8/1989 | Ishimaru | 74/11 |
| 5,511,436 | 4/1996 | Hasegawa | 74/331 |

FOREIGN PATENT DOCUMENTS

| | | |
|---|---|---|
| 58-39320 | 3/1983 | Japan . |
| 58-70921 | 5/1983 | Japan . |
| 63-20237 | 1/1988 | Japan . |
| 63-23222 | 6/1988 | Japan . |
| 6-191303 | 7/1994 | Japan . |

Primary Examiner—John A. Jeffery
Assistant Examiner—Chong H. Kim

[57] ABSTRACT

In a tractor comprising a hydraulic lift case (13) mounted on an upper surface of a tractor rear housing (4), a support plate (65) is disposed in an opening (57) in a top wall of the rear housing. This plate is mounted to the rear housing preferably through the lift case which covers the opening. A power take-off shaft (68) is supported in the lift case and is connected to a transmission shaft (34), driven by engine, at a location below the opening through a gear train (60, 61, 62) which passes through the opening and includes an intermediate gear (61) supported by the support plate. This take-off shaft permits taking off power to a spare space at an outside location of the lift case, where at least one pump (71; 72) driven by this shaft is preferably disposed. Another power take-off shaft (36) extending rearwardly of the rear housing is provided and is connected to the transmission shaft through a PTO-clutch (37) and through a speed change mechanism (38). A PTO-brake (63) for braking the latter take-off shaft and an interlock mechanism (64) for locking the change mechanism are provided using the support plate as a support therefor.

20 Claims, 11 Drawing Sheets

POWER TAKE-OFF ASSEMBLY FOR TRACTORS

FIELD OF THE INVENTION

This invention relates to a power take-off assembly for tractors. More particularly, the present invention relates to a power take-off assembly for tractors of a design in which a lift case for a hydraulic lift mechanism is mounted on an upper surface of a vehicle body housing at an axial end portion of the vehicle body.

BACKGROUND OF THE INVENTION

In a tractor having an engine mounted on a foremost portion of the vehicle body, a hydraulic pump for supplying fluid to one or more fluid-operated devices disposed at a rear end portion of the vehicle body, such as a hydraulic lift cylinder, is generally disposed at a foremost portion of the vehicle body so that it can be driven directly by the engine as shown, for example, in JP, U No. 58-39320. On the other hand, fluid or oil to be fed to such a pump is reserved within the vehicle body such that the inlet of a fluid suction path for the pump is located within a rear portion of the vehicle body so that, even when the tractor is climbing up a slope, the suction inlet is immersed in oil whereby failure in the suction of fluid or oil is not caused. One example of such arrangement of the fluid suction path is shown in the above-referenced Japanese publication. According to this arrangement of a hydraulic pump and a fluid suction path therefor, both of the suction path and a fluid supply path from the pump to the fluid-operated device are large in length.

Accordingly, there is known, as shown in JP, A No. 63-20237 and in JP, A No. 6-191303, a prior art in which a transmission shaft, constantly driven by engine, is provided within the vehicle body such that it extends to an axial mid location of the vehicle body where a PTO-clutch is disposed for connecting the transmission shaft to a rear power take-off shaft, and in which a hydraulic pump of the above-referenced function is mounted on an outer surface of a side wall of the vehicle body such that driving power therefore is taken off from the transmission shaft at a location just before the PTO-clutch.

This structure will greatly reduce the length of a fluid suction path for the pump and that of a fluid supply path from the pump to a fluid-operated device disposed at a rear portion of the vehicle body, as compared to the structure in which a hydraulic pump is disposed at a foremost location of the vehicle body. However, fluid suction and supply paths of a considerably large length are still required. Further, the arrangement of a pump on an outer side surface of the vehicle body at an axial mid portion thereof will prevent a step for use in riding the tractor from being arranged at a low level. Because linkage means and other connecting or operating means are concentratedly arranged in proximity to an outer surface of the vehicle body, the pump must be arranged such that it does not cause an interference with such linkage means etc. Further, such linkage means will make inspection or maintenance of the pump difficult.

In a tractor having a power take-off shaft projecting outwardly from a rear housing of the vehicle body, there is known from, for example, JP, Y2 No. 63-23222 to provide a PTO-brake which is operable to brake the power take-off shaft in the disengaged condition of a PTO-clutch for selectively transmitting power to the take-off shaft. In the tractor shown in the above-referenced Japanese publication, the PTO-clutch is fashioned into a fluid-operated clutch and the PTO-brake is associated with this fluid-operated PTO-clutch such that the operation of PTO-brake is controlled by a single-acting hydraulic cylinder to which fluid pressure for operating the clutch is applied. When the PTO-clutch is placed in the disengaged condition, fluid pressure applied to the single-acting cylinder is released and the PTO-brake is actuated by a biasing force of a spring whereby an inertial rotation of the power take-off shaft is stopped quickly. The PTO-brake is further operable to prevent a rotation of the power take-off shaft can be caused in the disengaged condition of the PTO-clutch due to a drag effect of fluid in the clutch. The single-acting hydraulic cylinder is disposed in a side wall of the tractor rear housing such that it projects outwardly from an outer surface of the side wall.

The structure according to this prior art requires to arrange the single-acting cylinder at a relatively rear location so that it does not interfere with a rear axle housing secured to an outer surface of the side wall and with linkage means disposed thereabout. Thus, the PTO-brake and the PTO-clutch to be braked by it are disposed at a relatively rear location within the rear housing. The rear end of the vehicle body is positioned rearwards correspondingly and the interval between the center axis of rear wheel axles and the rear end of the vehicle body is relatively enlarged. Such a relatively large interval will unbalance the ditribution of weight in an axial direction of the vehicle body particularly when an auxiliary implement of a large weight, such as a rotary tiller, is connected to the rear of the vehicle body. In order to improve the balance, there is a need of attaching a relatively large counterweight to the front of the vehicle body.

In the power take-off assembly shown in the above-referenced JP, Y2 No. 63-23222, there are further provided a speed change mechanism disposed between the PTO-clutch and the power take-off shaft and an interlock mechanism for locking the change mechanism in the engaged condition of PTO-clutch. The interlock mechanism comprises a fluid-acutuated locking member disposed within a thicked wall portion of the tractor rear housing where one end of a slidable fork shaft is supported. Here again, fluid pressure for operating the PTO-clutch is used such that this locking member is actuated to lockingly engage the fork shaft when the PTO-clutch is placed in its engaged condition. For this, a lengthy fluid passage is formed in the wall of the tractor rear housing for conducting clutch-operating fluid to the thickened wall portion.

An object of the present invention is to provide a novel power take-off assembly for tractors which is easily assembled into a tractor and which permits taking-off power for driving a hydraulic pump, pest-controlling implememt or other auxiliary implement disposed at an axial end portion of the vehicle body to a space where a power take-off member does not cause an interference with other components.

A related object is to provide a power take-off assembly in which a pump for hydraulically operating one or more fluid-operated devices disposed at an axial end portion of the vehicle body is arranged at a suitable location.

Another object of the present invention is to provide a power take-off assembly which further includes a PTO-clutch for selectively transmitting power to a power take-off shaft projecting axially outwardly from the vehicle body, and which is easily assembled into a tractor.

A further object of the invention is to provide a power take-off assembly in which a PTO-brake for braking the power take-off shaft in the disengaged condition of PTO-clutch is provided in a way in which balance as to the distribution of weight in the axial direction of the vehicle body is improved.

A still further object of the invention is to provide a power take-off assembly in which a speed change mechanism is disposed between the PTO-clutch and the power take-off shaft and in which an interlock mechanism for locking the speed change mechanism in the engaged condition of PTO-clutch is provided in a simple way.

SUMMARY OF THE INVENTION

The present invention relates to a power take-off assembly for tractors of a design in which a lift case (13) for a hydraulic lift mechanism is mounted on an upper surface of a vehicle body housing (4) at an axial end portion of the vehicle body. In a top wall of the vehicle body housing (4) is formed an opening (57), which is covered by the lift case (13).

Particularly, a support plate (65) is disposed in the opening (57) and is mounted to the vehicle body housing (4). Preferably, the support plate is attached to the lift case (13) such that it extends at a part thereof into the lift case whereby it is mounted to the vehicle body housing (4) through the lift case. A transmission shaft (34) adapted to be driven by an engine (1) is provided and it extends to a location below the openig (57).

A rotatable power take-off member (68) is supported in the lift case (13) for taking off power from an inside of the lift case. Preferably, this power takt-off member is fashioned into a power take-off shaft disposed within an outwardly opening internal space (13a) in the lift case. Transmission means (60, 61, 62) which passes through the opening (57) is provided for connecting the power take-off member or shaft (68) to the transmission shaft (34). Preferably, the transmission means is composed of a gear train including at least one intermediate gear (61) which is supported by the support plate (65).

The power take-off assembly of the above-referenced structure according to the present invention permits taking off power form an inside of the lift case to an outside location of this case where a relatively large spare space exists. The opening in a top wall of the vehicle body housing, which can be used to assemble gears and other elements into the body housing, is used also for assembling the power take-off assembly into the tractor. At least one intermediate gear of the gear train can be supported in advance by the support plate and the rotatable power take-off member or shaft can be supported in advance by the lift case, so that these gear and power take-off member can be assembled into the tractor at the same time when the lift case is mounted on an upper surface of the vehicle body housing.

The rotational direction to be given to the power take-off member or shaft can be selected by selecting the number of gears of the gear train. The rotational speed to be given to the power take-off member or shaft can be selected by selecting the gear ratio of the gear train.

One or more hydraulic pumps for supplying fluid to one or more fluid-operated devices can simply be provided such that at least one pump (71, 72) driven by the power take-off shaft (68) is mounted on an outer surface of the lift case (13). This arrangement of pump is optimal in that it will reduce the length of both of a fluid suction path for the pump and a fluid supply path from the pump to a fluid-operated device disposed at an axial end portion of the vehicle body. The pump mounted on an outer surface of the lift case can be arranged without any interference with other components such as linkage means and allows an easy inspection or maintenance thereof. Of course, such a pump does not prevent a step for use in riding the vehicle from being arranged at a low level.

For concentratedly arranging fluid supply means so as to shorten the fluid conduits and so as to permit an easy assembling of such supply means, it is preferred that at least one valve mechanisms (98, 103, 146) connected to the hydraulic pump is mounted on the lift case 13.

In a tractor having a power take-off shaft (36) which projects outwardly from the vehicle body housing (4) along an axial direction of the vehicle body, a fluid-operated PTO-clutch (37) for selectively connecting the power take-off shaft to the transmission shaft (34) is preferably provided and is disposed at a location below the opening (57) in a top wall of the vehicle body housing. The PTO-clutch thus arranged can easily be assembled into the vehicle body housing through the opening.

For braking the power take-off shaft (36) at the disengaged condition of PTO-clutch (37), a PTO-brake (63) is preferably provided and it includes a fluid-operated brake-control member (75) which is supported by the support plate (65). For operating the brake-control member, the support plate preferably includes a fluid chamber (78) into which fluid for operating the PTO-clutch is conducted. The brake-control member supported by the support plate is disposed within the vehicle body housing and can be arranged without any interference with other components on or in proximity to the outer side surface of the vehicle body housing, such as an axle housing. Consequently, PTO-clutch to be braked by the PTO-brake can be disposed at a location as near to wheel axles as possible such that the interval between the center axis of wheel axles and the axial end of the vehicle body will be shortened, whereby balance as to the distribution of weight in the axial direction of the vehicle body can be improved.

In a power take-off assembly comprising a speed change mechanism (38) which is disposed between the PTO-clutch (37) and the power take-off shaft (36) projecting axially outwardly from the vehicle body housing (4), an interlock mechanism (64) for locking the speed change mechanism at the disengaged condition of PTO-clutch is preferably provided and it includes a fluid-actuated locking member (83) which is supported by the support plate (65). For actuating the locking member, the support plate preferably includes a fluid chamber (85) into which fluid for operating the PTO-clutch is conducted. Such an interlock mechanism can be pre-assembled using the support plate and can easily be assembled into the vehicle body housing.

As can be understood now, the support plate (65) disposed in the opening (57) can be used for providing various devices or components of the power take-off assembly in d simple way. This plate also permits arranging each device or component of the power take-off assembly at a suitable location. This support plate may be mounted directly to the vehicle body housing using mounting bosses or flange projecting integrally from an inner surface of the vehicle body housing. However, the support plate mounted to the vehicle body housing through the lift case (13) is preferred, as set forth above, because such a support plate permits an easier assembling and because the area of opening (57) is not narrowed by the mounting bosses or flange on the inner surface of vehicle body housing.

BRIEF DESCRIPTION OF THE DRAWINGS

The present invention and its attendant advantages will become more readily apparent as the specification is considered in conjunction with the accompanying drawings in which.

DESCRIPTION OF A PREFERRED EMBODIMENT

Figure 1:
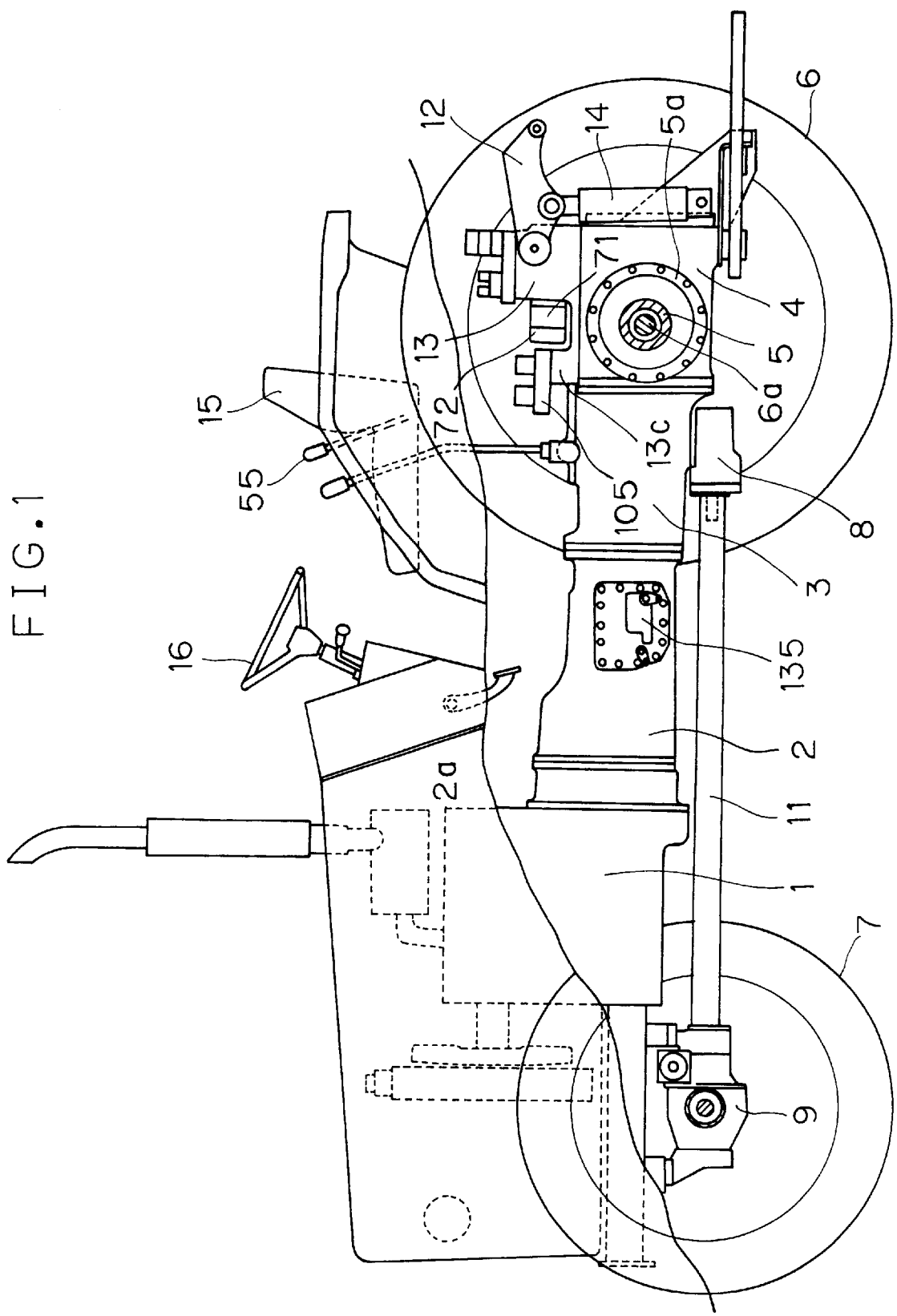
FIG. 1 is a sectional view, partially cut-away, of a tractor in which an embodiment of the power take-off assembly according to the present invention is employed.

FIG. 1 shows a tractor in which a preferred embodiment of the present invention is employed. Engine 1 as a drive source is mounted on a frontmost end of the vehicle body. The vehicle body is composed of a front housing 2, transmission casing 3 and rear housing 4 which are arranged in series in a longitudinal direction of the tractor and are fastened together. To left and right outer side surfaces of the rear housing 4, left and right rear axle housings 5 are secured at their base end flanges 5a. Left and right rear wheel axles 6a extend outwardly of the rear housing 4 and thorough the left and right axle housings 5. The tractor shown is adapted to run by constantly driving left and right rear wheels 6 and, if necessary, by additionally driving left and right front wheels 7. To a lower surface of the transmission casing 3 is attached a front wheel drive case 8 from which a transmission shaft 10 shown in FIG. 2 extends forwardly into a tubular cover 11 for transmitting vehicle-driving power into a front axle casing 9.

As also shown in FIG. 1, a lift case 13 for a hydraulic lift mechanism is mounted on an upper surface of the rear housing 4. Left and right lift arms 12 are supported by the lift case 13, and left and right hydraulic lift cylinders 14 for rotationally displacing these arms 12 are arranged at both sides behind the rear housing 4. Seat 15 is disposed at a location above the transmission casing 3. At a location before the seat 15 is disposed a steering wheel 16 for operating left and right front wheels 7 to turn and to thereby steer the vehicle.

Figure 2:
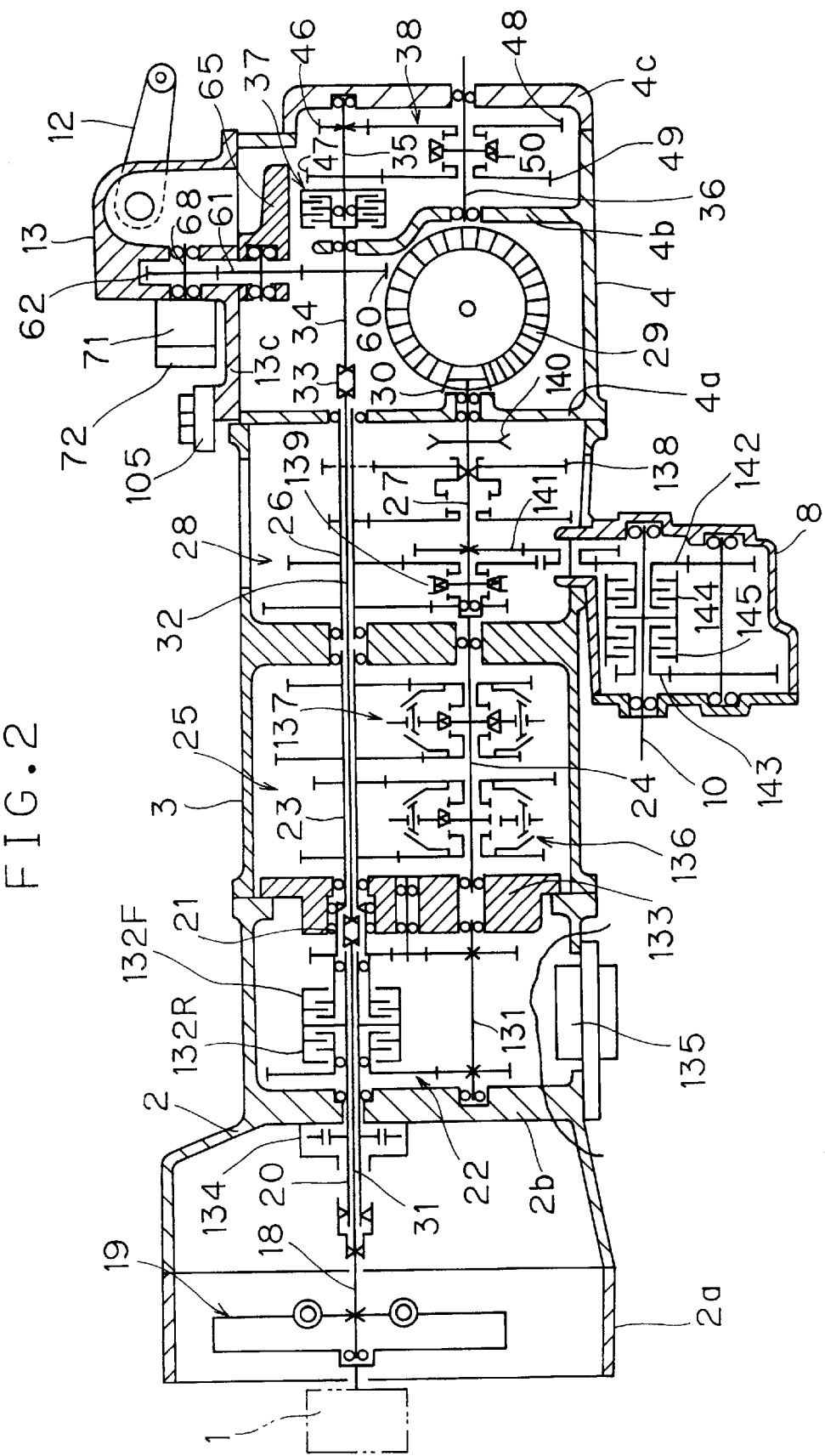
FIG. 2 is a schematic sectional side view, partially developed, showing the whole transmission system employed in the tractor shown in FIG. 1.

FIG. 2 shows the transmission system employed in the tractor. Front housing 2 includes a separately formed front end case portion 2a within which a shock-absorbing spring mechanism 19 is disposed for transmitting the power of engine 1 to a primary drive shaft 18 in a shock-free manner. To the primary drive shaft 18 is coupled a hollow primary shaft 20 of the vehicle drive-power transmission line. A hollow output shaft 21 of a small length is disposed coaxially with and behind the primary shaft 20, and a direction-reversing mechanism 22 operable between these hollow shafts 20 and 21 is disposed within a rear half of the front housing 2. To the output shaft 21 is coupled a hollow drive shaft 23 which is disposed within the transmission casing 3. A change speed shaft 24 is disposed parallel to and below the drive shaft 23, and a main speed change mechanism 25 operable between these shafts 23 and 24 is disposed within a front half of the transmission casing 3. Within a rear half of the transmission casing 3, there are disposed a hollow intermediate shaft 26 which is co-axial with the drive shaft 23, a propeller shaft 27 which is co-axial with the change speed shaft 24, and an auxiliary speed change mechanism 28 which is operable between the change speed shaft 24 and the propeller shaft 27. Propeller shaft 27 includes a rear end portion which extends into the rear housing 4 and carries thereon a bevel pinion 30 meshing with a larger input bevel gear 29 of a differential gearing (not shown) for the rear wheels.

Figure 3:
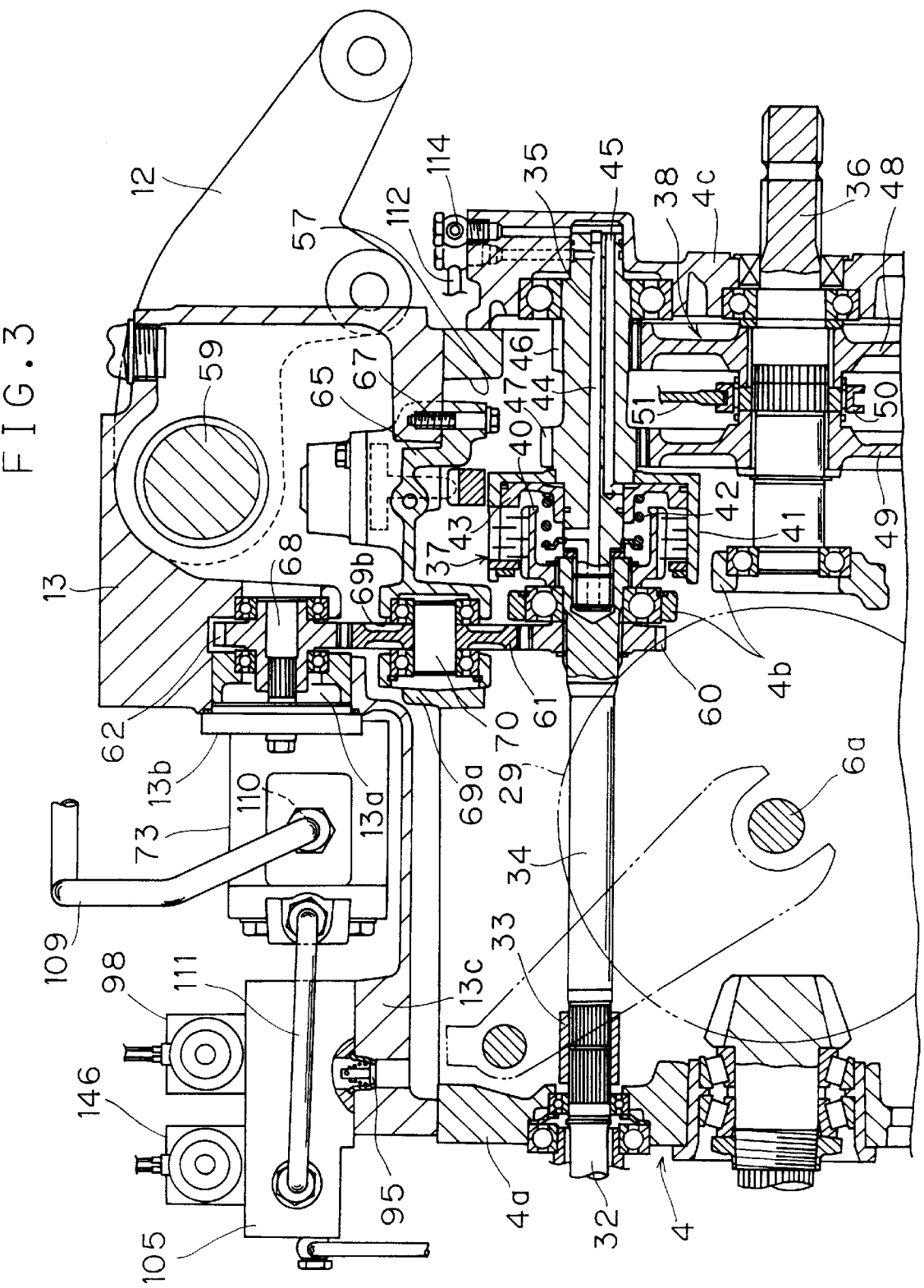
FIG. 3 is a sectional side view showing a rear part of the tractor shown in FIG. 1.

As also shown in FIG. 2, a primary shaft 31 of the power take-off line is coupled to the primary drive shaft 18 and it extends through the hollow primary shaft 20 of the vehicle drive-power transmission line. A transmission shaft 32, which is coupled to the primary shaft 31, extends through the hollow drive shaft 23 and intermediate shaft 26 and into the rear housing 4. Within the rear housing 4, there are disposed a transmission shaft 34 which is coupled to the transmission shaft 32 through a coupling member 33, a drive shaft 35 which is disposed co-axially with and behind the transmission shaft 34, and a power take-off shaft 36 which is disposed below the drive shaft 35 and which extends rearwardly of the rear housing 4. A fluid-operated PTO-clutch 37 is disposed between the transmission shaft 34 and the drive shaft 35, and a mechanical speed change mechanism 38 is disposed between the drive shaft 35 and the power take-off shaft 36. As shown in FIGS. 2 and 3, rear housing 4 has a front wall 4a, an intermediate support wall portion 4b which upstands from an inner bottom of the housing 4, and a rear end cover 4c which closes a rear end opening of the housing 4. A rear end portion of the transmission shaft 32 is supported by the front wall 4a, and a rear end portion of the transmission shaft 34 is supported by the support wall portion 4b. Drive shaft 35 is supported, at its front end portion, by a journal bore in a rear end portion of the transmission shaft 34 and, at its rear end portion, by the rear end cover 4c. Power take-off shaft 36 is supported, at its front and rear end portions, by the support wall portion 4b and by the rear end cover 4c.

As best seen from FIG. 3, PTO-clutch 37 is fashioned into a frictional multi-disc type comprising alternately arranged first frictional elements and second frictional elements which are slidably but non-rotatably supported respectively by a rotatable support member 40, fixedly mounted on a rear end portion of the transmission shaft 34, and by a clutch cylinder 41 fixedly mounted on a front end portion of the drive shaft 35. Clutch 37 includes a piston 43 which is biased to move toward a dirction of disengaging the clutch by a return spring 42. When clutch-operating fluid pressure is applied to the piston 43 to advance it, the first and second frictional elements are engaged frictionally whereby the clutch is engaged. Drive shaft 35 includes in it a fluid passage 44 for supplying clutch-operating fluid from an interior of the rear end cover 4c to a fluid chamber behind the piston 43, and another fluid passage 45 for supplying lubricant from all interior of the rear end cover to the frictional elements and to the bearing for the front end portion of drive shaft 35.

Figure 4:
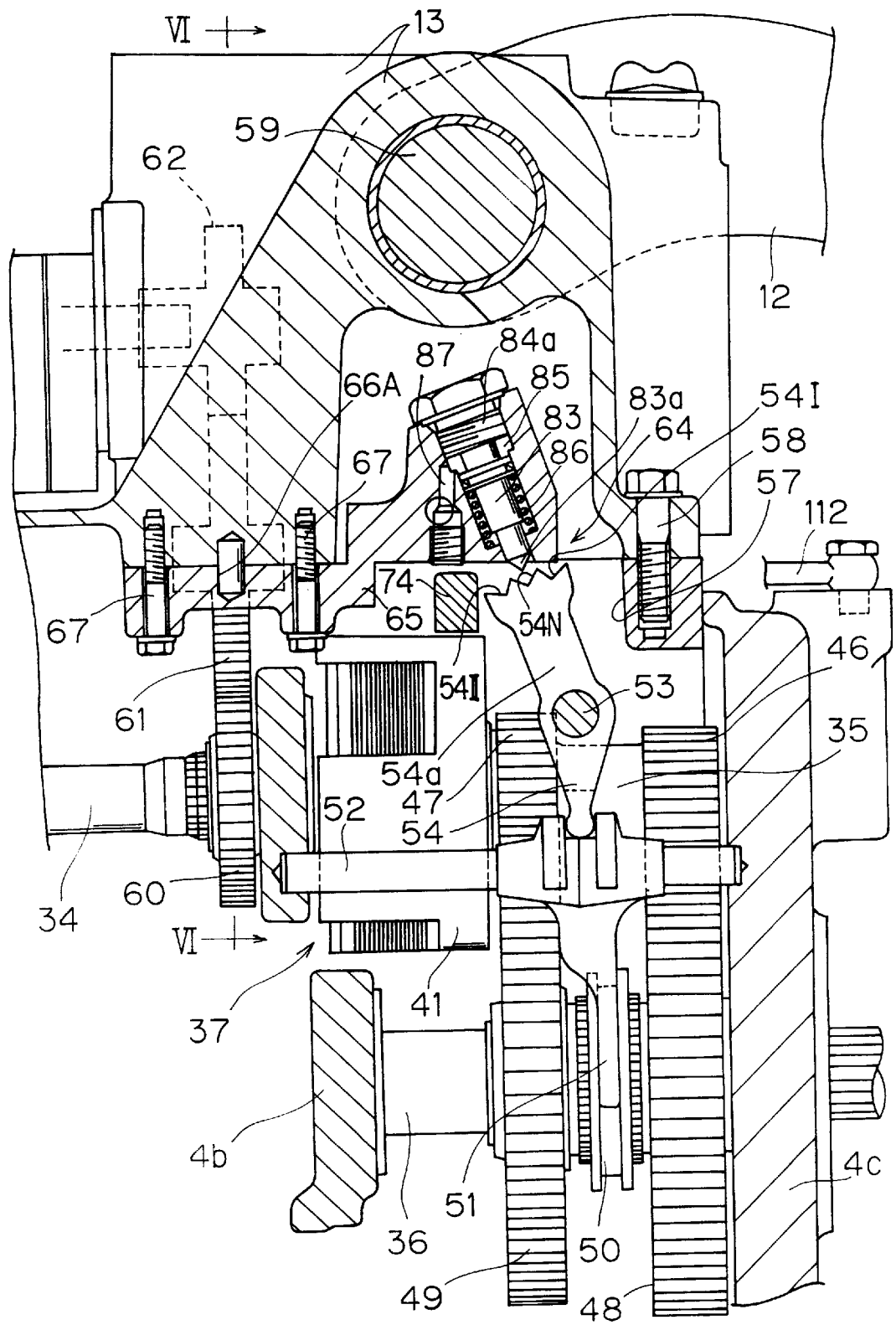
FIG. 4 is a sectional side view of the rear part of the tractor showing a section different from the one shown in FIG. 3 in an enlarged scale.
Figure 5:
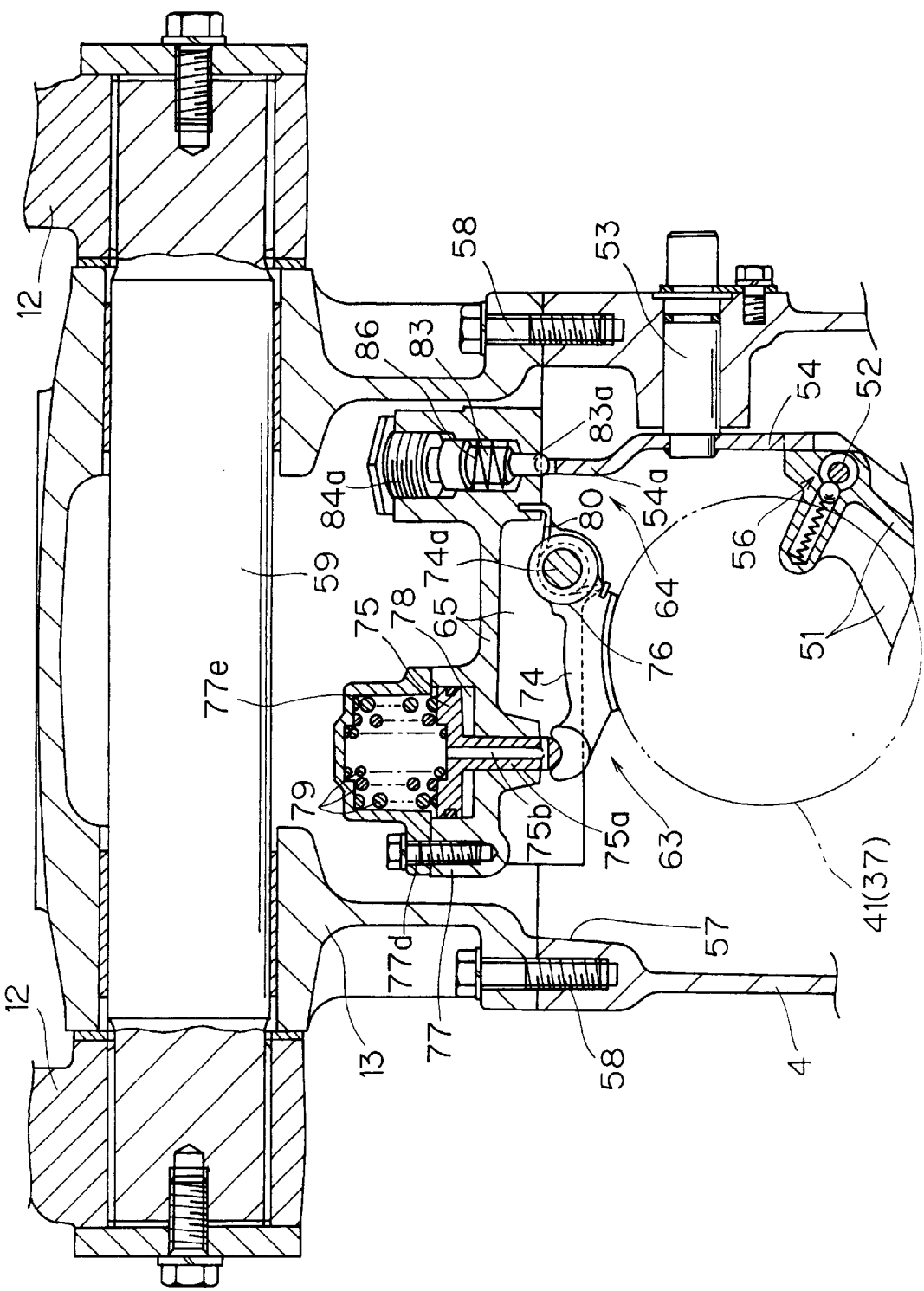
FIG. 5 is a sectional front view of the rear part of the tractor.

As shown in FIGS. 2 and 3, the speed change mechanism 38 is fashioned into a two-stage change mechanism comprising two gears 46 and 47 which are fixedly mounted on the drive shaft 35, two gears 48 and 49 which are rotatably mounted on the power take-off shaft 36 and are meshed with the gears 46 and 47, and a shifter sleeve 50 which are slidably but non-rotatably mounted on the power take-off shaft 36 for selectively coupling the gears 48 and 49 to the shaft 36. For shifting the shifter sleeve 50 on and along the power take-off shaft 36, a shifter fork 51 engaging the sleeve is provided and is slidably mounted, as shown in FIGS. 4 and 5, on a fork shaft 52 which extends axially of the vehicle and is fixedly supported, at its ends, by the support wall portion 4b and by the rear end cover 4c. A rotatable control shaft 53 extends through a side wall of the rear housing 4 and has at its inner end an operating arm 54, fixedly secured thereto, which engages an upper end portion of the shifter fork 51 such) that the shifter sleeve 50 is slidingly displaced by a rotational displacement of the control shaft 53. Control shaft 53 is operatively connected to a speed change lever 55 shown in FIG. 1. As shown in FIG. 5, a detent or latching mechanism 56 is disposed between the shifter fork 51 and the fork shaft 52.

As shown in FIGS. 3 to 6, the lift case 13 has a generally gate-shaped configuration. This case 13 is mounted on an upper surface of the rear housing 4 such that it covers an opening 57 formed in a top wall of the housing 4 at a location above the PTO-clutch 37, and is fixedly secured to the housing 4 using bolts 58 which are threadingly engaged into corresponding threaded bores in the rear housing from the upper side thereof. Opening 57 is used for assembling gears and other elements into the rear housing 4. Lift case 13 supports a rotatable lift arm shaft 59 which extends laterally of the vehicle body and carries, at its ends, left and right lift arms 12 secured thereto.

There are provided, in association with the power take-off assembly shown, a power take-off mechanism comprising a gear train of gears 60, 61 and 62, shown in FIG. 3, for taking-off power from the transmission shaft 34, a PTO-brake 63, best shown in FIG. 5, or braking the driven side of PTO-clutch 37 and thereby braking the power take-off shaft 36 at the disengaged condition of this clutch 37, and an interlock mechanism 64, shown in FIGS. 4 and 5, for locking the speed change mechanism 38 or its shifter sleeve 50 at the engaged condition of PTO-clutch 37. As main support means for these mechanisms, there is provided a support plate 65 which extends between interiors of the rear housing 4 and lift case 13.

As shown in FIGS. 7 to 10, this support plate 65 has a gegerally square-shaped configuration leaving several support portions. Plate 65 includes a suitable number of positioning pin-passing bores 66A and bolt-passing bores 66B and is fastened to the lift case 13 using bolts 67 which are inserted through the bores 66B from the underside of the plate and are engaged in the corresponding threaded bore in the lift case 13, as shown in FIGS. 3, 4 and 6.

Figure 6:
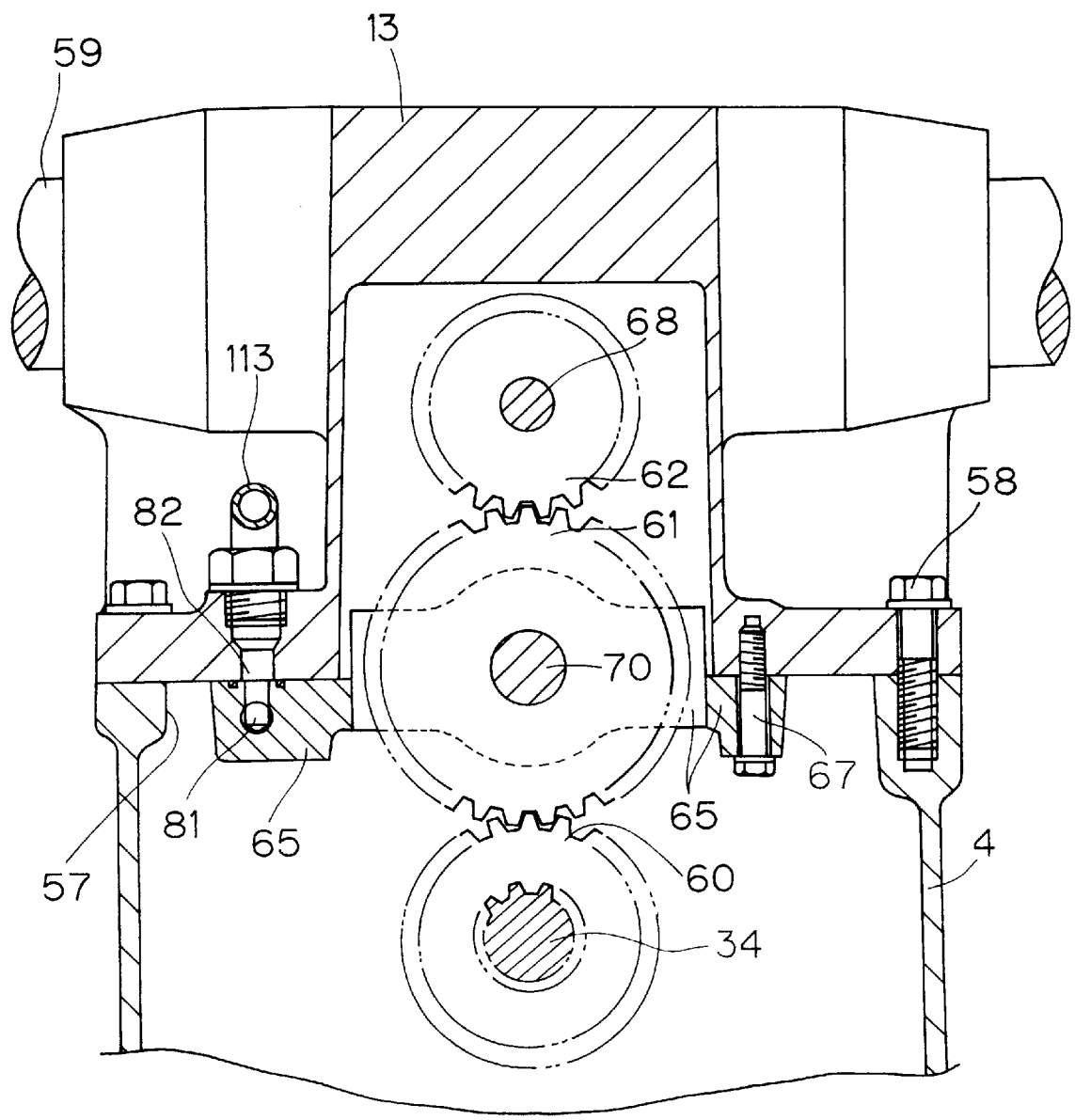
FIG. 6 is a sectional view taken generally along line VI—VI of FIG. 4.
Figure 7:
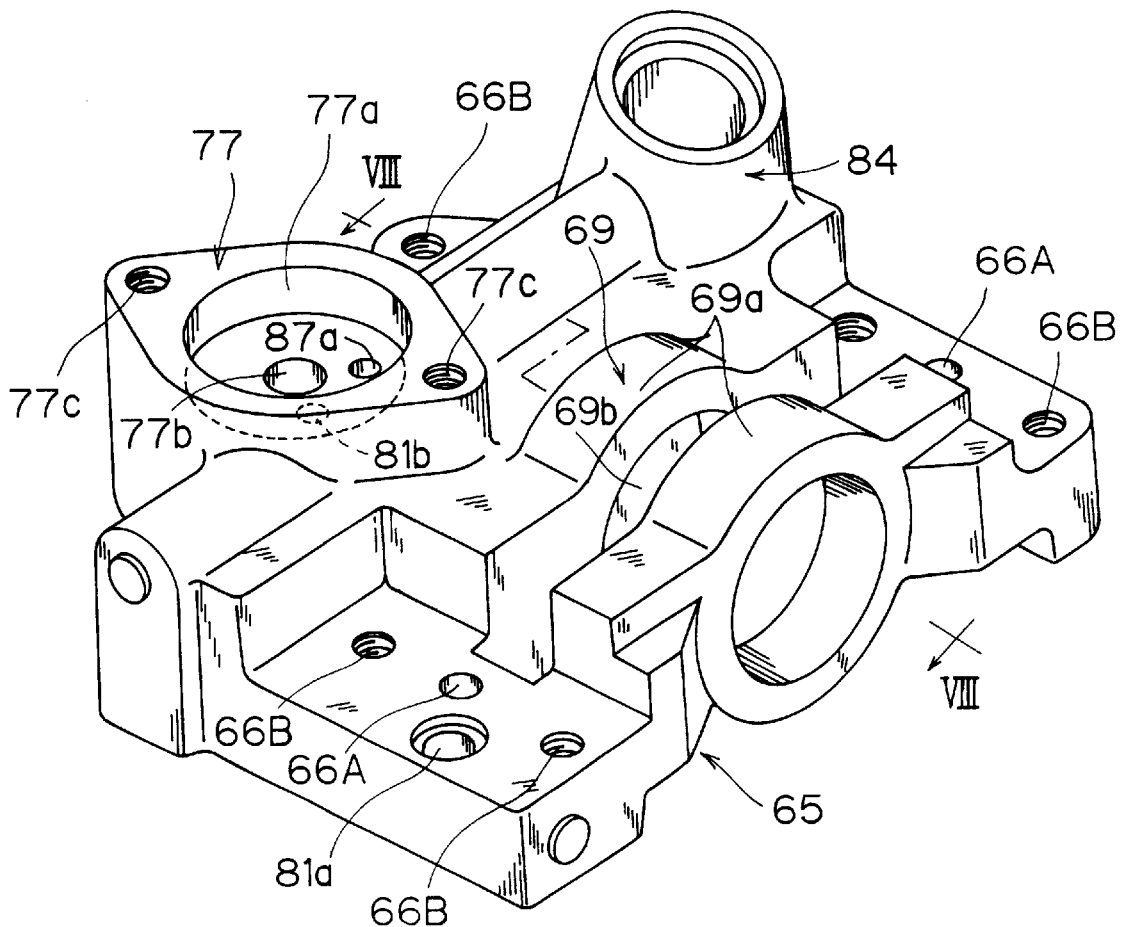
FIG. 7 is a perspective view of a support plate shown in FIGS. 3 to 6.
Figure 8:
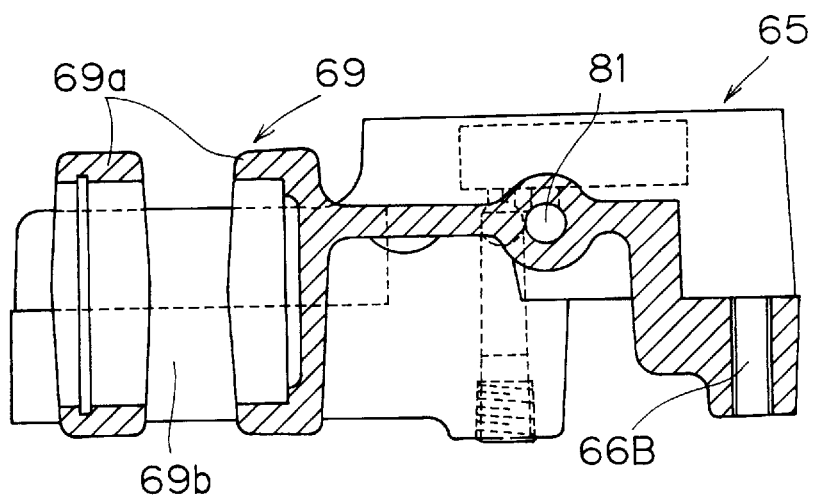
FIG. 8 is a sectional view taken generally along line VIII—VIII of FIG. 7.

As shown in FIGS. 3 and 6, the gear train of the power take-off mechanism set forth above comprises a gear 60 which is fixedly mounted on the transmission shaft 34, a gear 62 which is disposed within an internal space 13a in the lift case 13 and is fixedly mounted on a rotatable power take-off shaft 68 supported by the case 13, and an intermediate gear 61 which is meshed with both of the gears 60 and 62. As shown in FIGS. 7 and 8, support plate 65 includes a gear support portion 69 which comprises a pair of bearing portions 69a and an elongated gear-accommodating bore 69b therebetween. As shown in FIG. 3, intermediate gear 61 is fixedly mounted on an intermediate shaft 70 of a small length, which is received in the pair of bearing portions 69a through ball bearings, and is disposed within the bore 69b. Power take-off shaft 68 extends through a cover plate 13b, which closes a front end opening of the internal space 13a, forwardly of the lift case 13. Two hydraulic pumps 71 and 72 shown in FIGS. 1 and 2, adapted to be driven by the take-off shaft 68, are mounted on a front surface of the lift case 13 and is housed in a common casing 73.

Figure 9:
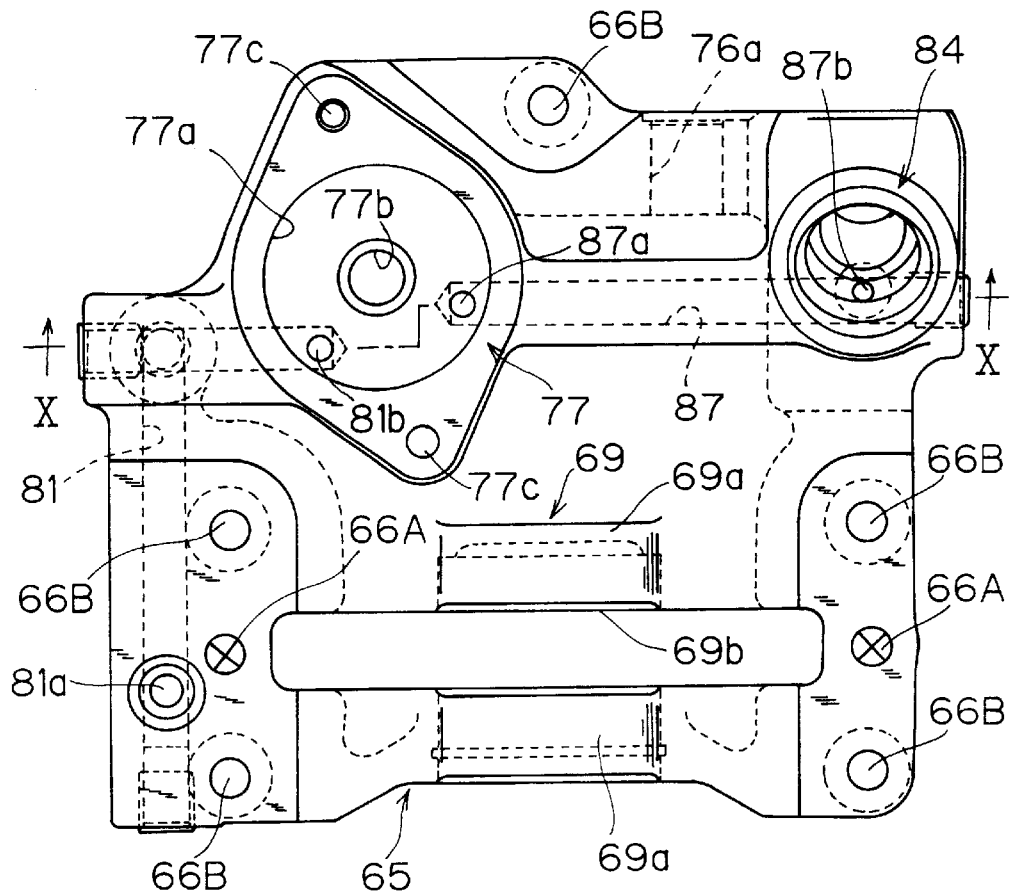
FIG. 9 is a plane view of the support plate shown in FIGS. 7 and 8.
Figure 10:
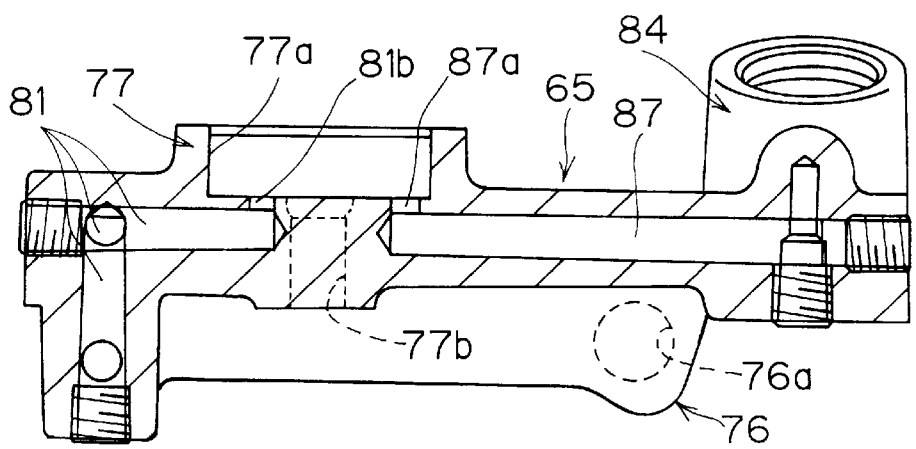
FIG. 10 is a sectional view taken generally along line X—X of FIG. 9.

As shown in FIG. 5, PTO-brake 63 comprises a brake shoe 74, which is faced to the clutch cylinder 41 of PTO-clutch 37, and a piston 75 for operating the brake shoe 74 to move. For supporting a pin 74a which rotatably supports the brake shoe 74 at one end of this shoe, support plate 65 is provided, at the lower side of a rear portion thereof, with a shoe support portion 76 having a pin-receiving bore 76a, as shown in FIGS. 9 and 10. Further, as shown in FIGS. 7 to 10, support plate 65 is provided, at the upper surface of a front portion thereof, with a brake-controller support portion 77 which includes a piston-receiving bore 77a having an open top end. In the bottom of piston-receiving bore 77a is formed a small-sized central bore 77b which extends to a lower surface of the support plate 65. As shown in FIG. 5, piston 75 includes, at its lower surface, a rod portion 75a which extends through the bore 77b. A fluid chamber 78 is formed between the lower surface of piston 75 and the inner bottom of piston-receiving bore 77a. A cap 77e is attached to the upper end of support portion 77 and is fastened to the support plate 65 using bolts 77d which are engaged in threaded bores 77c, shown in FIGS. 7 and 9, formed in the support portion 77. A plurality of coil springs 79 are disposed between cap 77e and piston 75 for biasing the piston to move downwards.

As also shown in FIG. 5, brake shoe 74 is biased to move away from the clutch cylinder 41 by a torque spring 80 of a relatively small biasing force, which is disposed on the pin 74a, such that the shoe 74 is kept in engagement, at its free end, with the rod portion 75a of piston 75. Clutch-operating fluid for actuating PTO-clutch 37 is conducted into the fluid chamber 78 such that PTO-brake 63 is operated in response to the operation of PTO-clutch 37. In the engaged condition of clutch 37, fluid under pressure is supplied into the fluid chamber 78 so that piston 75 is in a lifted position whereby the brake shoe 74 is disengaged from the clutch cylinder 41. In the disengaged condition of clutch 37 in which fluid pressure is released from the fluid chamber 78, piston 75 is lowered by the biasing force of coil springs 79 so that brake shoe 74 is rotationally displaced against the biasing force of torque spring 80 whereby the shoe 74 is engaged with the clutch cylinder 41 to brake this cylinder and, therefore, power take-off shaft 36. For conducting clutch-operating fluid into the fluid chamber 78, support plate 65 is provided, as shown in FIGS. 7 to 10, with a fluid passage 81 which opens, at its one end 81a, at the upper surface of a front end portion of the plate 65 and, at the other end 81b, at the inner bottom of piston-receiving bore 77a and, therefore, into the fluid chamber 78. As shown in FIG. 6, this fluid passage 81 is communicated with a fluid passage 82, in the lift case 13, which is adapted to be supplied with clutch-operating fluid. As shown in FIG. 5, piston 75 and its rod portion 75a include a bleed hole 75b for bleeding off the closed space above the piston 75.

The interlock mechanism 64 is designed to be operable in response to the operation of PTO-brake 63 and it includes a movable lock member 83 shown in FIGS. 4 and 5. For supporting this lock member 83, support plate 65 is provided, as shown in FIGS. 7, 9 and 10, at the upper surface of a rear corner portion thereof with a cylindrical interlock support portion 84. As shown in FIGS. 4 and 5, lock member 83 is slidably received in the slightly inclined cylindrical support portion 84 such that a cone-shaped end projection 83a of this lock member 83 extends downwardly from the lower surface of support plate 65. A threaded cap 84a is threadingly attached to the upper end of support portion 84a such that a fluid chamber 85 is defined within the cylindrical support portion 84 and below the cap 84a. A coil spring 86 is disposed within the support portion 84 such that the lock member 83 is biased to move upwards. The operating arm 54 for operating the shifter fork 51 includes an integral lockable portion 54a which extends upwardly from the arm 54 in a slightly inclined relationship. This lockable portion 54a includes, at its upper end, three locking grooves 54N, 54I and 54II which correspond to the neutral position and two operative positions of the shifter sleeves 50 for shifting the speed change mechanism 38. As shown in FIGS. 7, 9 and 10 support plate 65 is provided with a fluid passage 87 which opens, at its one end 87a, at tile piston-receiving bore 77a of the brake-controller support portion 77 and, at the other end 87b, into the interlock support portion 84. As shown in FIG. 4, this passage 87 is communicated with the fluid chamber 85 within the support portion 84.

Consequently, lock member 83 is moved downwardly at the engaged condition of PTO-clutch 37, in which PTO-brake 63 is disactuated, by fluid pressure applied into the fluid chamber 85. In this condition, the cone-shaped end projection 83a of lock member 83 engages in any one of the locking grooves 54N, 54I and 54II such that the operating arm 54 is kept from any rotational movement. By this locking action, shifter sleeve 50 is kept from being displaced from its neutral position to one of the two operative positions or from an operative position toward the neutral position. At the disengaged condition of PTO-clutch 37 in which PTO-brake 63 is actuated, fluid pressure is released from the fluid chamber 85 so that lock member 83 is retreated upwardly by the biasing force of coil spring 86 whereby the interlocking action is released.

Figure 11:
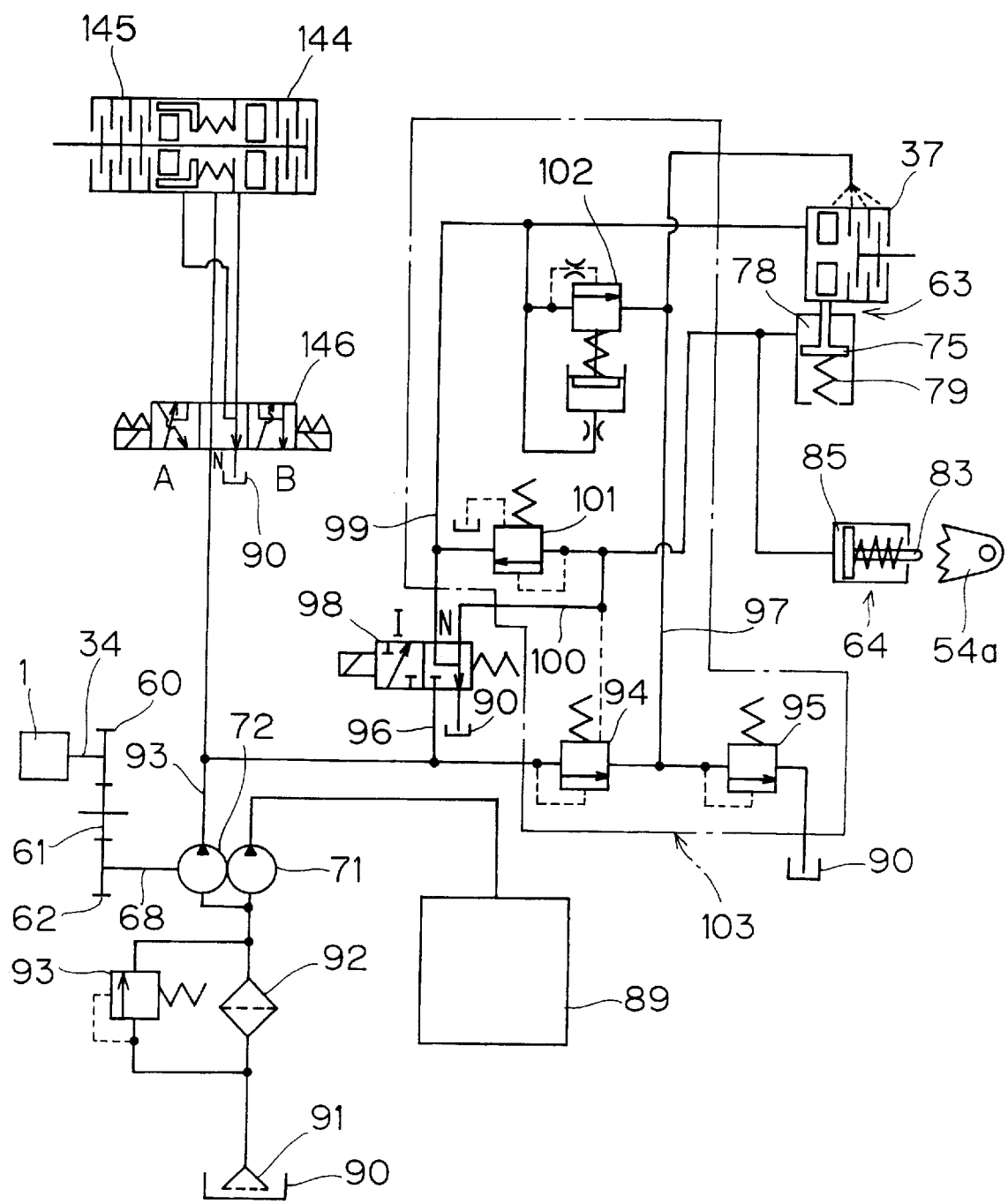
FIG. 11 is a circuit diagram schematically illustrating the fluid supply system employed in the tractor shown.

FIG. 19 schematically illustrates a fluid supply system for various fluid-operated devices including devices having been detailed hereinbefore. Of the two hydraulic pumps 71 and 72 driven by the power take-off shaft 68, pump 71 is used for supplying operating fluid to the hydraulic lift cylinders 14 and to another plural fluid-operated devices such as a posture-controlling hydraulic cylinder (not shown) for maintaining the horizontal posture of an auxiliary implement (not shown) which is connected to the rear of the tractor. These lift cylinders and another fluid-operated devices are generally shown in FIG. 11 as a block 89. The PTO-clutch 37, PTO-brake 63 and interlock mechanism 64 are supplied with operating fluid by means of the other pump 72. Fluid is pumped by the hydraulic pumps 71 and 72 from a fluid reservoir 90 which is provided by a lower portion of the interior of rear housing 4. A filter 91 is disposed within the reservoir 90, and another filter 92 is incorporated in a suction line between the reservoir and pumps. Preparing for the case when the line filter 92 is choked, a bypath valve 93 is provided which is connected in parallel with the line filter 92 and which is operable to relieve fluid, when the filter 92 is choked and fluid pressure at the inlet side thereof is heightened, so as to continue the supply of fluid to the pumps 71 and 72.

To the disc charge path 93' of pump 72, there are connected a primary relief valve 94 for establishing an operating fluid pressure and a secondary relief valve 95 for establishing a lubricant pressure. An operating fluid supply path 96 is connected to the inlet side of primary relief valve 94 and is directed toward the PTO-clutch 37, PTO-brake 63 and interlock mechanism 64, whereas a lubricant supply path 97 is connected to the fluid path between the primary and secondary relief valves 94 and 95. An electromagnetic control valve 98 is connected to the fluid supply path 96 and it has a neutral position N and an operative position I. To the outlet side of this directional control valve 98, there are connected a fluid path 99, directed toward the PTO-clutch 37, and another fluid path 100 directed toward the PTO-brake 63 and interlock mechanism 64. The latter path 100 is further connected to the former path 99 through a relief valve 101 which is operable at a relatively low relief pressure. For gradually increasing fluid pressure applied to the PTO-clutch 37, a well-known modulating relief valve 102 is provided and is connected to the fluid path 99. It is designed that fluid relieved from this relief valve 102 is joined to lubricant in the lubricant supply path 97.

In the neutral position N of electromagnetic control valve 98, fluid is drained from PTO-clutch 37 and from the respective fluid chambers 78 and 85 of the PTO-brake 63 and interlock mechanism 64 so that PTO-clutch 37 is in its disengaged condition, PTO-brake 63 is in its actuated condition and the interlock mechanism 64 is in its lock-releasing condition. In the operative position I of electromagnetic control valve 98, fluid is supplied, under an relief-operating condition of the low pressure relief valve 101, to PTO-clutch 37 and to the respective fluid chambers 78 and 85 of the PTO-brake 63 and interlock mechanism 64. Consequently, PTO-clutch 37 is in its engaged condition, PTO-brake 63 is in its non-actuated condition and the interlock mechanism 64 is in its interlocking condition. An end portion of the fluid path 99 is provided by the operating fluid passage 44 in the drive shaft 35 referred to above with respect to FIG. 3, and an end portion of the lubricant path 97 is provided by the lubricant passage 45 in the drive shaft 35 also referred to above with respect to FIG. 3. Pump 72 is also used for the purpose of taking off the front wheel-driving power and another electromagnetic valve 146 is provided for this purpose, as will be detailed later.

Figure 12:
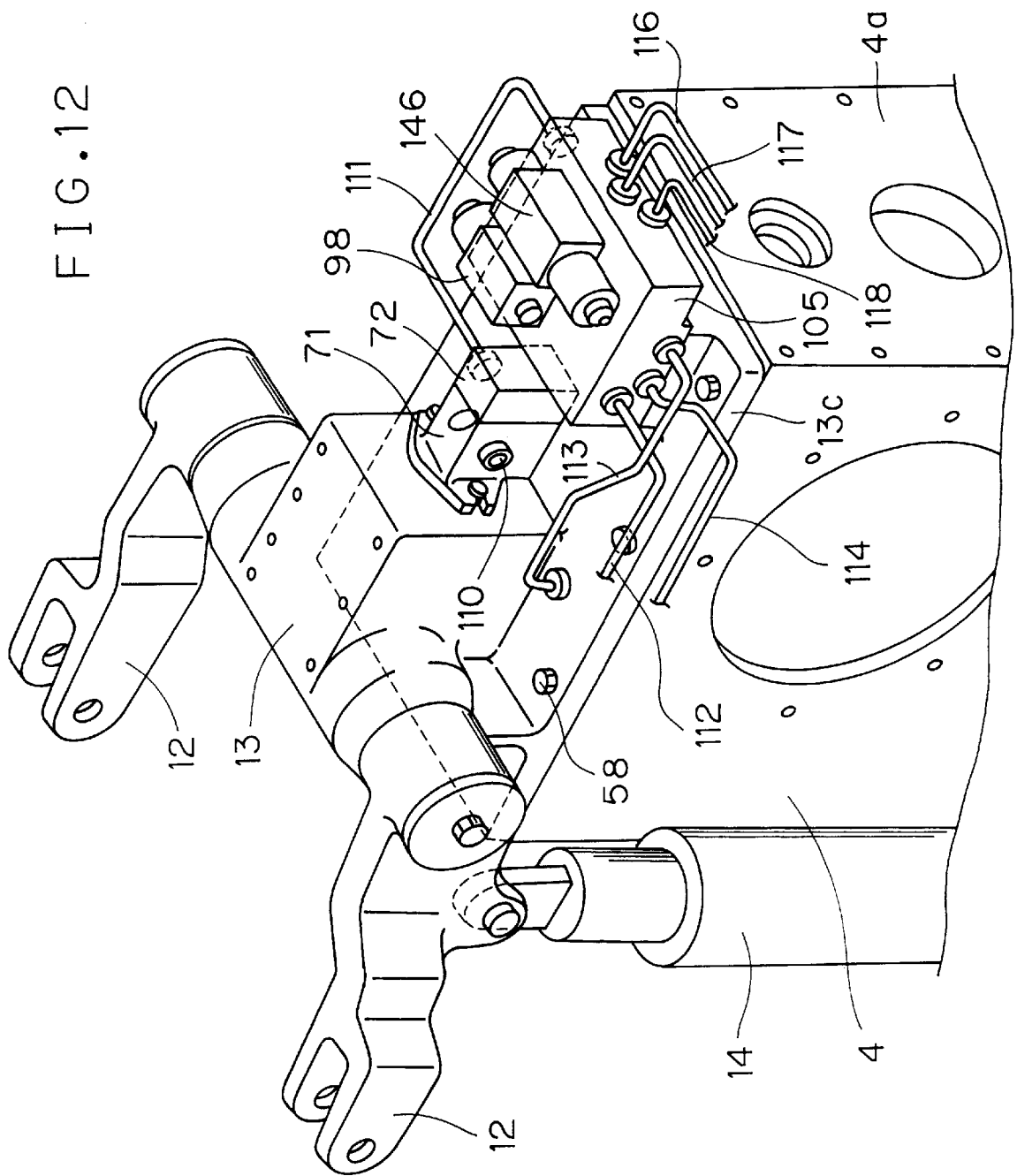
FIG. 12 is a schematic perspective view showing an upper portion of a rear part of the tractor.

As clearly shown in FIG. 12, the lift case 13 is provided integrally with a plate-shaped mounting base 13c which extends to a foremost location of the rear housing 4. On a front portion of this mounting base 13c is fixedly mounted a valve block 105 on which the electromagnetic control valves 98 and 146 referred to above with respect to FIG. 11 are disposed. The hydraulic pumps 71 and 72 are located just behind the valve block 105. The relief valves 94, 95, 101 and 102 also referred to above with respect to FIG. 11 are fashioned, together with fluid paths therebetween, into a unit as a valve assembly 103 as shown in FIG. 11 and are disposed in the valve block 105. For example, the secondary relief valve 95 is disposed, as shown in FIG. 3, between tile valve block 105 and the mounting base 13c such that fluid relieved from this relief valve 95 is returned directly into the rear housing 4.

Figure 13:
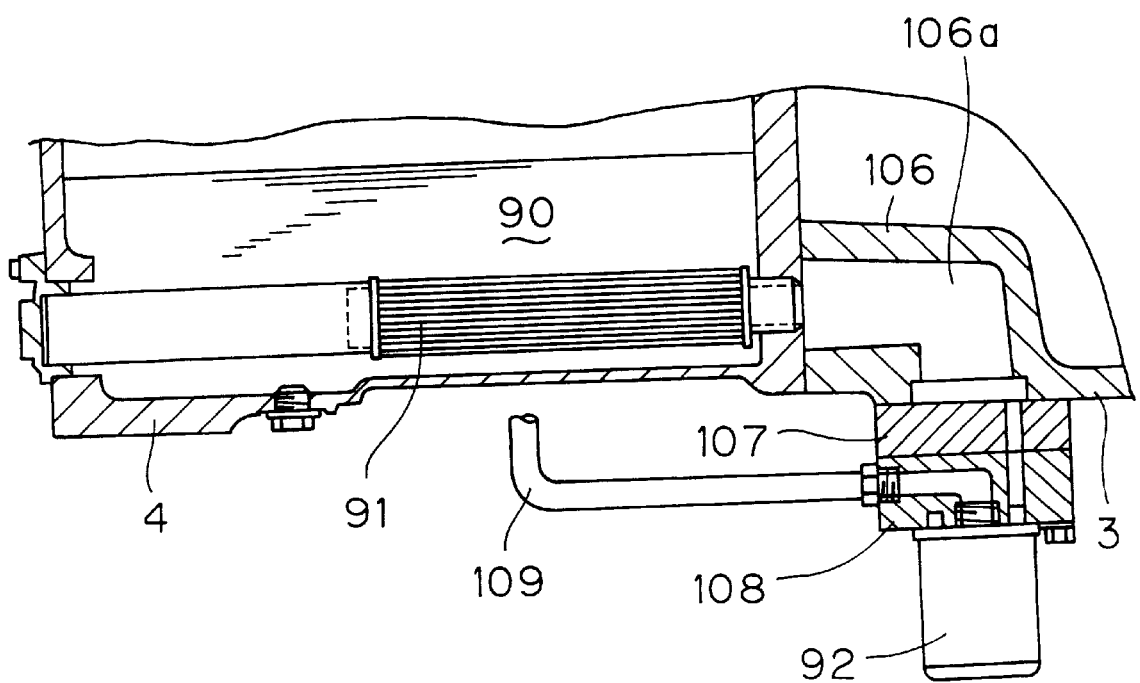
FIG. 13 is a sectional side view, partially developed, showing a lower portion of a rear part of the tractor.
Figure 11:
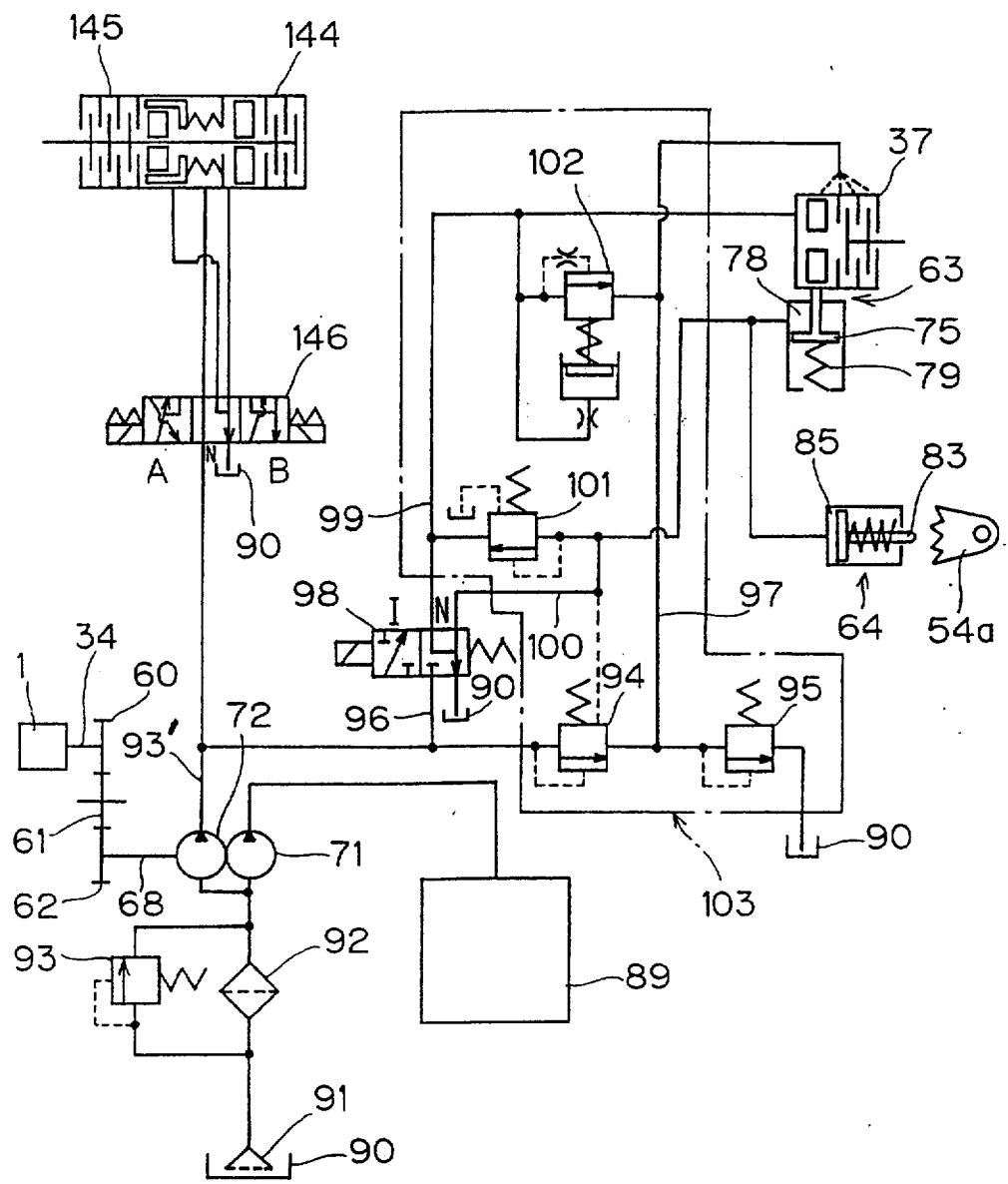

FIG. 13 illustrates a lower portion of the rear housing 4 the interior of which provides the fluid reservoir 90 shown in FIG. 11. Filter 91 referred to above with respect to FIG. 11 extends axially of the vehicle and is supported by the rear housing 4. A fluid outlet portion 106 is defined in a side wall of the transmission casing 3 and it includes a chamber 106a which is in fluid communication with the inside of filter 91.

Line filter 92 referred to above with respect to FIG. 11 is arranged on the rear housing 4 with two plate members 107 and 108 therebetween such that the filter 92 is communicated with the chamber 106a through fluid passages in the plate members 107 and 108. Bypath valve 93 also referred to above with respect to FIG. 11 and not shown in FIG. 13 is similarly arranged in a parallel relationship with the filter 92. A suction pipe 109 extends upwardly from the plate member 108.

This suction pipe 109 is connected, at its upper end, to a suction inlet 110 which is common to the pumps 71 and 72, as shown in FIGS. 3 and 12. The suction inlet 110 is shown in FIG. 3 at a side opposite to the side where it is actually located. As also shown in FIGS. 3 and 12, pump 72 is connected to the valve block 105 through a connecting pipe 111. Valve block 105 includes in it fluid paths in the valve assembly 103 shown in FIG. 11, and fluid supply pipes 112 and 113 for PTO-clutch 37 and for PTO-brake 63 and a lubricant supply pipe 114 extend from a side surface of the valve block 105 rearwardly. Of these pipes, pipes 112 and 114 are connected respectively to the rear end cover 4c of rear housing 4, as shown in FIGS. 3 and 4, and, then, to the fluid passages 44 and 45 in the drive shaft 35 through fluid passages in the rear end cover 4c. Fluid supply pipe 113 is connected, as shown in FIG. 6, to the fluid passage 82 in the lift case 13. As shown in FIG. 12, three fluid supply pipes 116, 117 and 118 extend from the valve block 105 for supplying fluid to fluid-operated clutches 144 and 145 for taking-off front wheel drive power, which will be detailed later.

Transmission system of the vehicle drive line will be outlined by referring to FIG. 2. The direction-reversing mechanism 22, disposed within a rear half of the front housing 2, comprises an intermediate shaft 131 for connecting between the primary shaft 20 and output shaft 21 through a reversing gearing, a forward directional fluid-operated clutch 132F for directly connecting between the primary shaft 20 and output shaft 21, and a backward directional fluid-operated clutch 132R for connecting the primary shaft 20 and output shaft 21 through the reversing gearing. Front housing 2 includes, at an axial mid portion thereof, an integral partition 2b for supporting shafts, and, at an axial rear end portion, a bearing frame 133 which is attached to the rear of front housing 2. A hydraulic pump 134 for supplying operating fluid to the fluid-operated clutches 132F and 132R is mounted on a front surface of the partition 2b and is adapted to be driven by the primary shaft 20. A control valve assembly 135 for controlling operations of the clutches 132F and 132R are supported, as shown in FIGS. 1 and 2, by the front housing 2 such that it extends through a side wall of this housing 2.

The main speed change mechanism 25, which is disposed within a front half of the transmission casing 3, includes lour speed-change gear trains, disposed between the drive shaft 23 and the change speed shaft 24, which are selectively actuated by two double-acting synchronous clutches 136 and 137, disposed on the change speed shaft 24, so as to provide four speed change ratios. Intermediate shaft 26 is connected to the change speed shaft 24 through speed-reduction meshing gears, and the auxiliary speed change mechanism 28, which is disposed within a rear half of the transmission casing 3, includes three rotating gears, two being mounted on the intermediate shaft 26 while the other one being disposed outside the intermediate shaft. For providing rotation to the propeller shaft 27 selectively at three speed ratios through these three gears, there are disposed on the propeller shaft 27 three gears, including one shift gear 138, and a clutch 139 which is also operable to couple the propeller shaft 27 directly to the change speed shaft 24. Thus, the auxiliary speed change mechanism 28 will provide four different speed ratios to the propeller shaft 27. In FIG. 2, numeral 140 designates a pulley, fixedly mounted on the propeller shaft 27, which is braked by a parking brake (not shown).

As also shown in FIG. 2, a front wheel drive gear 141 is fixedly mounted on the propeller shaft 27. Within the front wheel drive case 8, a synchronously driving gear 142 and an acceleratedly driving gear 143 are rotatably mounted on the transmission shaft 10 such that they are driven to rotate by the front wheel drive gear 141. On the transmission shaft 10, there are disposed a fluid-operated clutch 144 for coupling the synchronously driving gear 142 to this transmission shaft 10 and another fluid-operated clutch 145 for coupling the acceleratedly driving gear 142 to this shaft 10. As shown in FIG. 11, pump 72 is also connected to the fluid-operated clutches 144 and 145 through an electromagnetic control valve 146 which has a neutral position N, at synchronously driving position A for actuating the clutch 144, and an acceleratedly driving position B for actuating the clutch 145. Front wheels 7 are driven to rotate at a synchronous speed of rotation with rear wheels 6 when the electromagnetic control valve 146 is placed in its synchronously driving position A, whereas front wheels 7 are driven to rotate at an accelerated speed of rotation as compared to rear wheels 6 when the electromagnetic control valve 146 is placed in its acceleratedly driving position B. This control valve 146 is adapted to be displaced in response to the operation of steering wheel 16, shown in FIG. 1, to the acceleratedly driving position B so as to attain a quick turn of the vehicle.

Although the arrangement of hydraulic lift cylinders 14 at locations outside the lift case 13 will increase the available space around this case such lift cylinders can also be arranged within the vehicle housing, as shown, for example, in U.S. Pat. No. 3,405,766 and in JP, U No. 58-70921. A load to be driven by the rotatable power take-off member or shaft 68 may be a hydraulic pump or, instead, a pest-control implement or another implement. Further, the present invention can be applied to a tractor in which the layout shown is axially reversed such that the hydraulic lift mechanism and power take-off assembly are arranged at a front portion of the vehicle. The present invention is, thus, by no means limited to the particular embodiment shown.

I claim:

1. In a tractor in which a lift case for a hydraulic lift mechanism is mounted on an upper surface of a vehicle body housing at an axial end portion of the vehicle body, said lift case rotatably supporting a lift arm shaft (59) which extends laterally of the vehicle body and has, at its ends, left and right lift arms (12) secured to said lift arm shaft, a power take-off assembly comprising:

an opening (57) formed in a top wall of said vehicle body housing (4), said opening being covered by said lift case (13);

a support plate (65) disposed in said opening (57), said support plate being mounted to said vehicle body housing (4);

a transmission shaft (34) extending axially of the vehicle body to a location below said opening (57), said transmission shaft being adapted to be driven by an engine (1);

a rotatable power take-off member (68) supported in said lift case (13) for taking off power from an inside of said lift case to an outer space of said lift case; and a gear train (60, 61, 62) passing through said opening (57) and connecting said power take-off member (68) to said transmission shaft (34), said gear train including at least one intermediate gear (61) supported by said support plate (65).

2. The power take-off assembly as set forth in claim 1, wherein said support plate (65) is attached to said lift case (13) such that said support plate extends at a part thereof into said lift case, whereby said support plate is mounted to said vehicle body housing (4) through said lift case.

3. The power take-off assembly as set forth in claim 1, wherein said power take-off member includes a power take-off shaft (68) disposed within an outwardly opening internal space (13a) in said lift case (13).

4. The power take-off assembly as set forth in claim 3, wherein at least one pump (71, 72) driven by said power take-off shaft (68) is mounted on an outer surface of said lift case (13).

5. The power take-off assembly as set forth in claim 4, wherein at least one valve mechanism (98, 103, 146) connected to said pump (71, 72) is mounted on said lift case (13).

6. The power take-off assembly as set forth in claim 1, further comprising a power take-off shaft (36) which projects outwardly from said vehicle body housing (4) along an axial direction of the vehicle body, said power take-off shaft being connected to said transmission shaft (34) through a fluid-operated PTO-clutch (37) which is disposed within said vehicle body housing at a location below said opening (57).

7. The power take-off assembly as set forth in claim 6, further comprising a PTO-brake (63) which is operable to brake said power take-off shaft (36) at the disengaged condition of said PTO-clutch (37), said PTO-brake including a fluid-operated brake-control member (75) supported by said support plate (65) and a fluid chamber (78) in said support plate for operating said brake-control member, fluid for operating said PTO-clutch (37) being conducted into said fluid chamber (78).

8. The power take-of assembly as claimed in claim 6, further comprising a mechanical speed change mechanism (38) disposed between said PTO-clutch (37) and said power take-off shaft (36) and an interlock mechanism (64) for locking said speed change mechanism at the engaged condition of said PTO-clutch, said interlock mechanism including a fluid-actuated locking member (83) supported by said support plate (65) and a fluid chamber (85) in said support plate for actuating said locking member, fluid for operating said PTO-clutch (37) being conducted into said fluid chamber (85).

9. In a tractor in which a lift case for a hydraulic lift mechanism is mounted on an upper surface of a vehicle body housing at an axial end portion of the vehicle body, a power take-off assembly comprising:
an opening (57) formed in a top wall of said vehicle body housing (4), said opening being covered by said lift case (13);
a support plate (65) disposed in said opening (57), said support plate being mounted to said vehicle body housing (4);
a transmission shaft (34) extending axially of the vehicle body to a location below said opening (57), said transmission shaft being adapted to be driven by an engine (1);
a power take-off shaft (36) projecting outwardly from said vehicle body housing (4) along an axial direction of the vehicle body,
a PTO-clutch (37) disposed within said vehicle body housing (4) at a location below said opening (57), said PTO-clutch being operable to selectively connect and disconnect between said transmission shaft (34) and said power take-off shaft (36), and
a PTO-brake (63) for braking said power take-off shaft (36) at the disengaged condition of said PTO-clutch (36), said PTO-brake being supported by said support plate (65).

10. The power take-off assembly as set forth in claim 9, wherein said support plate (65) is attached to said lift case (13) such that said support plate extends at a part thereof into said lift case, whereby said support plate is mounted to said vehicle body housing (4) through said lift case.

11. The power take-off assembly as set forth in claim 9, wherein said PTO-brake (63) comprises a movable braking member (74) rotatably supported by said support plate (65) and a brake-control member (75) slidably supported by said support plate, said brake-control member being adapted to engage said braking member.

12. The power take-off assembly as set forth in claim 11, wherein said PTO-clutch (37) includes a fluid-operated clutch having a clutch cylinder (41), and wherein said movable braking member includes a brake shoe (74) which is supported by said support plate (65) rotatably in a direction toward and away from an outer surface of said clutch cylinder (41), said brake-control member (75) engaging a free end portion of said brake shoe (74).

13. The power take-off assembly as set forth in claim 9, wherein said PTO-clutch (37) includes a fluid-operated clutch, and wherein said PTO-brake (63) includes a brake which is actuated by the action of a spring (79) and is disactuated by the action of a pressurized fluid, said support plate (65) including a fluid chamber (78) into which fluid for operating said PTO-clutch is conducted.

14. The power take-off assembly as set forth in claim 13, wherein a mechanical speed change mechanism (38) is disposed between said PTO-clutch (37) and said power take-off shaft (36), and wherein a fluid-actuated locking member (83) for lockingly engaging a shifter member (54) for said speed change mechanism is movably supported by said support plate (65), said support plate further including a second fluid chamber (85) for actuating said locking member and a fluid passage (87) connecting said second fluid chamber (85) to said fluid chamber (78).

15. In a tractor in which a lift case for a hydraulic lift mechanism is mounted on an upper surface of a vehicle body housing at an axial end portion of the vehicle body, power take-off assembly comprising:
an opening (57) formed in a top wall of said vehicle body housing (4), said opening being covered by said lift case (13);
a support plate (65) disposed in said opening (57), said support plate being mounted to said vehicle body housing (4);
a transmission shaft (34) extending axially of the vehicle body to a location below said opening (57), said transmission shaft being adapted to be driven by an engine (1);
a power take-off shaft (36) projecting outwardly from said vehicle body housing (4) along an axial direction of the vehicle body
a PTO-clutch (37) disposed within said vehicle body housing (4) at a location below said opening (57), said PTO-clutch being operable to selectively connect and disconnect between said transmission shaft (34) and said power take-off shaft (36), a mechanical speed change mechanism (38) disposed between said PTO-clutch (37) and said power take-off shaft (36), said speed change mechanism being shifted by a sliding displacement of a shifter fork (51), a lockable member (54a) adapted to be rotationally displaced in response to the sliding displacement of said shifter fork (51); and a movable locking member (83) supported by said support plate (65), said locking member being moved to lockingly engage said lockable member (54a) when said PTO-clutch (37) is placed in its engaged condition.

16. The power take-off assembly as set forth in claim 15, wherein said support plate (65) is attached to said lift case (13) such that said support plate extends at a part thereof into said lift case, whereby said support plate is mounted to said vehicle body housing (4) through said lift case.

17. The power take-off assembly as set forth in claim 15, wherein said lockable member (54a) is formed integral with a rotatable arm member (54) for slidingly displacing said shifter fork (51).

18. The power take-off assembly as set forth in claim 17, wherein said PTO-clutch (37) includes a fluid-operated clutch, and wherein said support plate (65) includes a fluid chamber (85) into which fluid for operating said PTO-clutch (37) is conducted, said locking member (83) being biased to move toward said lockable member (54a) by a fluid pressure in said fluid chamber (85) and to move away from said lockable member by a spring (86).

19. In a tractor in which a lift case for a hydraulic lift mechanism is mounted on an upper surface of a vehicle body housing at an axial end portion of the vehicle body, a power take-off assembly comprising:

an opening (57) formed in a top wall of said vehicle body housing (4), said opening being covered by said lift case (13);

a support plate (65) disposed in said opening (57), said support plate being mounted to said vehicle body housing (4);

a transmission shaft (34) extending axially of the vehicle body to a location below said opening (57), said transmission shaft being adapted to be driven by an engine (1);

a power take-off shaft (36) projecting outwardly from said vehicle body housing (4) along an axial direction of the vehicle body, a PTO-clutch (37) disposed within said vehicle body housing (4) at a location below said opening (57), said PTO-clutch being operable to selectively connect and disconnect between said transmission shaft (34) and said power take-off shaft (36), a PTO-brake (63) for braking said power take-off shaft (36) at the disengaged condition of said PTO-clutch (37), said PTO-brake being supported by said support plate (65), a rotatable power take-off member (68) supported in said lift case (13) for taking off power from the inside of said lift case, and transmission means (60, 61, 62) for connecting said power take-off member (68) to said transmission shaft (34), said transmission means passing through said opening (57).

20. The power take-off assembly as set forth in claim 19, wherein said support plate (65) is attached to said lift case (13) such that said support plate extends at a part thereof into said lift case, whereby said support plate is mounted to said vehicle body housing (4) through said lift case.

* * * * *

UNITED STATES PATENT AND TRADEMARK OFFICE
CERTIFICATE OF CORRECTION

PATENT NO.  : 5,937,697
DATED       : August 17, 1999
INVENTOR(S) : Mizuya Matsufuji Page 1 of 2

It is certified that error appears in the above-indentified patent and that said Letters Patent is hereby corrected as shown below:

In the Drawing,

The Drawing Sheet, consisting of Fig. 11, should be deleted to be replaced with the Drawing Sheet, consisting on Fig. 11, as showns on the attached page.

Signed and Sealed this

Eighteenth Day of July, 2000

Attest:

Attesting Officer

Q. TODD DICKINSON

Director of Patents and Trademarks